US011203938B2

(12) United States Patent
Kottilingam et al.

(10) Patent No.: US 11,203,938 B2
(45) Date of Patent: Dec. 21, 2021

(54) AIRFOIL COUPON ATTACHMENT

(71) Applicant: General Electric Company, Schenectady, NY (US)

(72) Inventors: Srikanth Chandrudu Kottilingam, Greenville, SC (US); Jon Conrad Schaeffer, Greenville, SC (US); Brian Lee Tollison, Honea Path, SC (US)

(73) Assignee: General Electric Company, Schenectady, NY (US)

( * ) Notice: Subject to any disclaimer, the term of this patent is extended or adjusted under 35 U.S.C. 154(b) by 400 days.

(21) Appl. No.: 16/184,111

(22) Filed: Nov. 8, 2018

(65) Prior Publication Data

US 2020/0149407 A1    May 14, 2020

(51) Int. Cl.
  *F01D 5/18*    (2006.01)
  *B23P 15/04*   (2006.01)
  *F01D 5/14*    (2006.01)

(52) U.S. Cl.
  CPC .............. *F01D 5/187* (2013.01); *B23P 15/04* (2013.01); *F01D 5/147* (2013.01);
  (Continued)

(58) Field of Classification Search
  CPC ... F01D 5/00; F01D 5/005; F01D 5/14; F01D 5/147; F01D 5/18; F01D 5/282; F01D 9/02; F01D 25/28; B23P 6/005; B23P 15/04; F05D 2230/211; F05D 2260/36; F05D 2260/38; F03B 3/12; F04D 29/32; F04D 29/70
  See application file for complete search history.

(56) References Cited

U.S. PATENT DOCUMENTS 980,562 A    1/1911  Rice, Jr.
980,563 A    1/1911  Rice, Jr.
                     (Continued)

FOREIGN PATENT DOCUMENTS

EP       1914036 B1      3/2010
WO    2015026535 A1      2/2015
                     (Continued)

OTHER PUBLICATIONS

U.S. Appl. No. 16/184,052, Office Action dated Jul. 29, 2020, 15 pages.
(Continued)

*Primary Examiner* — David E Sosnowski
*Assistant Examiner* — Danielle M. Christensen
(74) *Attorney, Agent, or Firm* — Hoffman Warnick LLC

(57) ABSTRACT

A nozzle or blade for a turbomachine includes an airfoil body including at least one first coolant passage, and an edge opening in a leading edge or a trailing edge of the airfoil body. The edge opening has an edge coupon retention member seat in or on an inner surface of the airfoil body. An edge coupon has a shape at least partially configured for coupling to the edge opening in the airfoil body. The edge coupon includes an edge coupon body, at least one second coolant passage in the edge coupon body configured for fluid communication with the at least one first coolant passage in the airfoil body, and a retention member extending from the edge coupon body for coupling to the edge coupon retention member seat in the airfoil body.

20 Claims, 13 Drawing Sheets

(52) U.S. Cl.
CPC .. *F05D 2230/211* (2013.01); *F05D 2230/237* (2013.01); *F05D 2260/36* (2013.01)

(56) References Cited

U.S. PATENT DOCUMENTS

| | | | |
|---|---|---|---|
| 1,457,404 A | 6/1923 | Snyder | |
| 3,367,630 A | 2/1968 | Saunders | |
| 4,411,597 A | 10/1983 | Koffel et al. | |
| 5,269,057 A * | 12/1993 | Mendham | B23H 9/10 29/402.08 |
| 5,351,395 A * | 10/1994 | Crawmer | B23P 6/005 29/889.7 |
| 6,224,339 B1 | 5/2001 | Rhodes et al. | |
| 7,556,477 B2 | 7/2009 | Sherlock et al. | |
| 7,762,783 B2 | 7/2010 | Cairo et al. | |
| 7,832,988 B2 | 11/2010 | Bergander et al. | |
| 8,091,228 B2 | 1/2012 | Hiskes | |
| 8,529,212 B2 | 9/2013 | Smith et al. | |
| 8,734,107 B2 | 5/2014 | Butkiewicz et al. | |
| 8,978,249 B2 * | 3/2015 | Hovel | F01D 5/005 29/889.1 |
| 2006/0147300 A1 | 7/2006 | Toppen et al. | |
| 2007/0258825 A1 | 11/2007 | Shadbolt et al. | |
| 2007/0292273 A1 | 12/2007 | Downs | |
| 2013/0236318 A1 | 9/2013 | Prue | |
| 2014/0255194 A1 | 9/2014 | Jones | |
| 2015/0147164 A1 * | 5/2015 | Cui | B23P 6/005 415/175 |
| 2017/0211395 A1 | 7/2017 | Heffernan et al. | |
| 2018/0010458 A1 | 1/2018 | Chabane et al. | |
| 2018/0023395 A1 | 1/2018 | Jones et al. | |
| 2018/0030995 A1 | 2/2018 | Weisse | |
| 2018/0087385 A1 | 3/2018 | Weaver et al. | |
| 2018/0298765 A1 | 10/2018 | Beyer et al. | |

FOREIGN PATENT DOCUMENTS

| | | |
|---|---|---|
| WO | 2017074372 A1 | 5/2017 |
| WO | 2017074373 A1 | 5/2017 |

OTHER PUBLICATIONS

International Search Report for PCT Application No. PCT/US2019/059967 dated Apr. 10, 2020, 3 pages.
International Search Report and Written Opinion for corresponding PCT Application No. PCT/US2019/059972 dated Mar. 6, 2020, 12 pages.
U.S. Appl. No. 16/184,052 Final Office Action dated Feb. 12, 2021, 14 pages.
U.S. Appl. No. 16/184,052, Notice of Allowance dated Jun. 14, 2021, 12 pages.

* cited by examiner

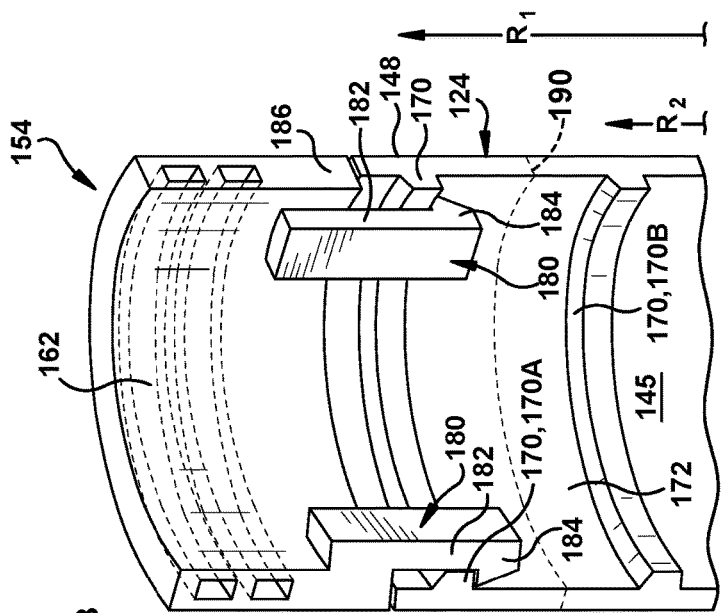
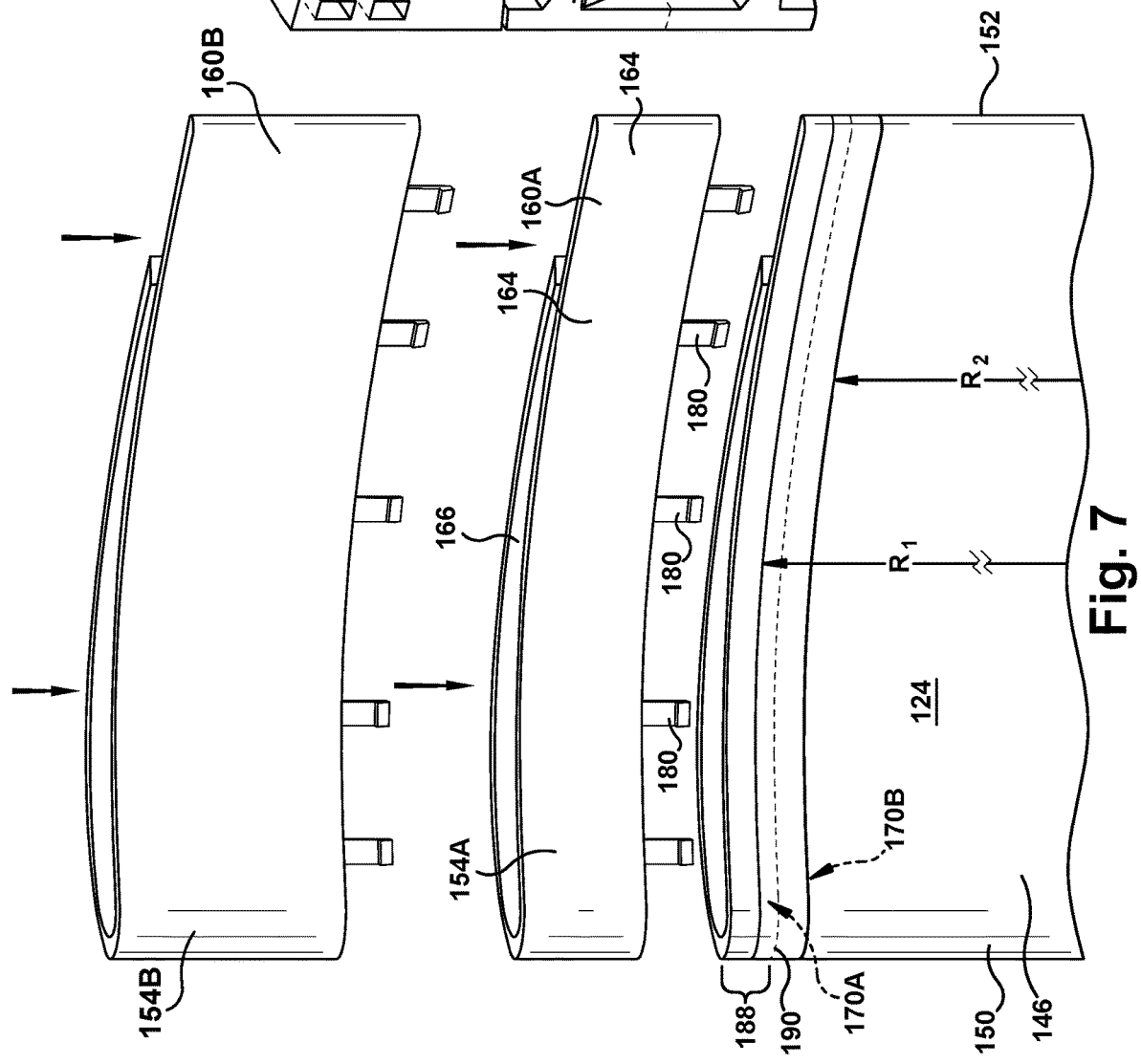

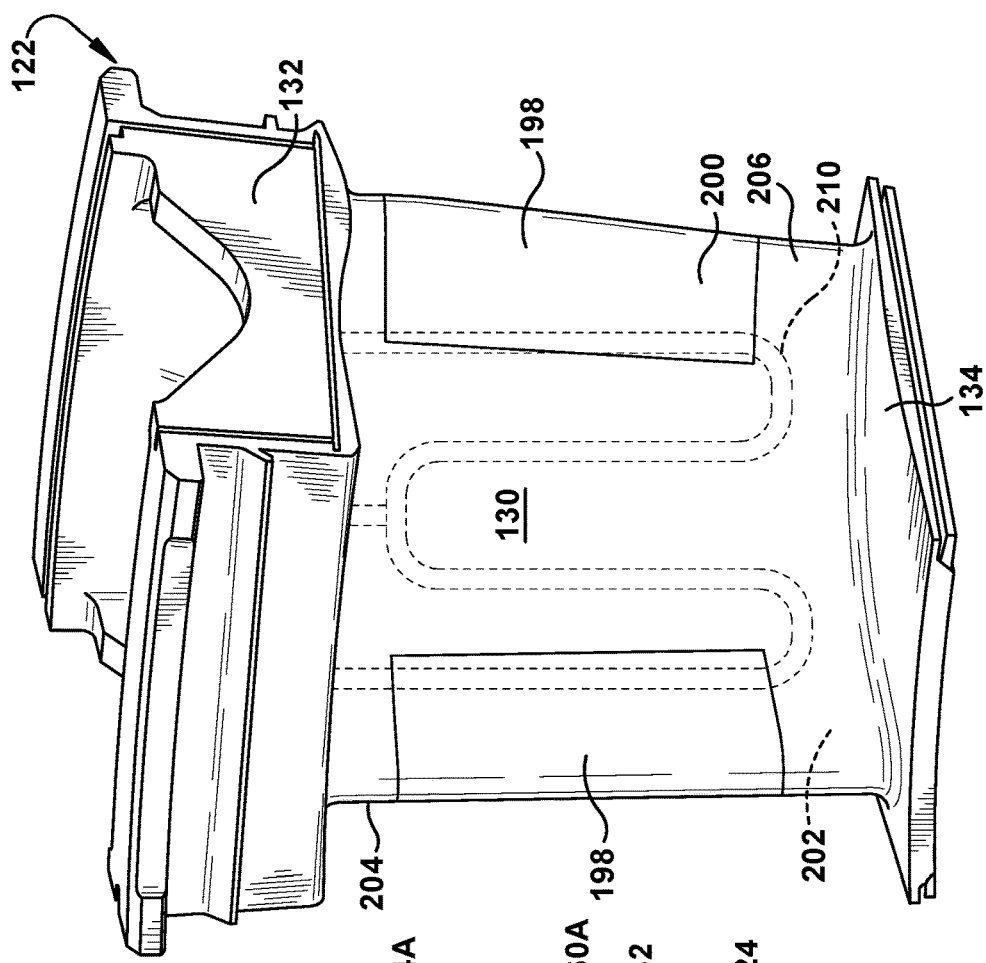
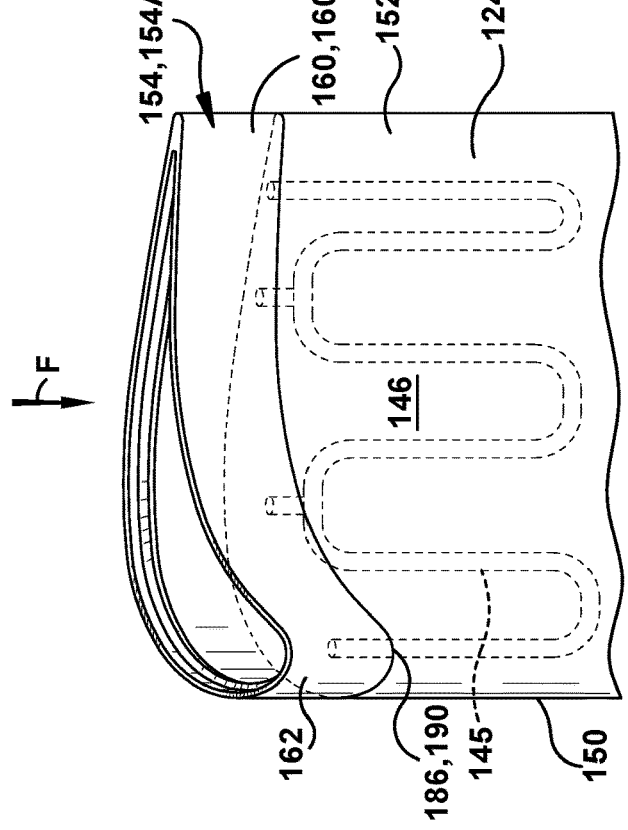

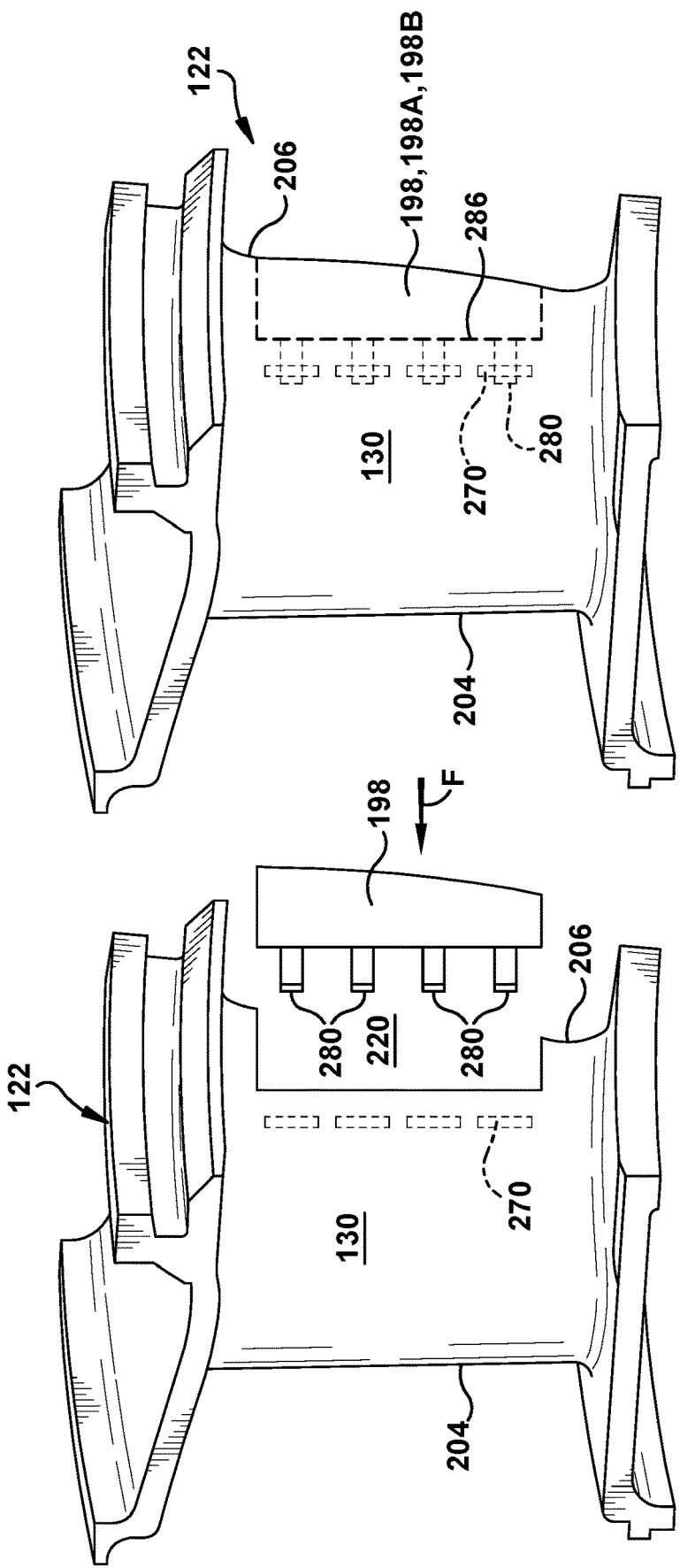

AIRFOIL COUPON ATTACHMENT

The application is related to U.S. application Ser. No. 16/184,052, filed concurrently herewith.

BACKGROUND OF THE INVENTION

The disclosure relates generally to airfoil coupon attachment, and more particularly, to systems for attaching a leading or trailing edge coupon to an airfoil body for use in a turbomachine.

Gas turbine systems are widely used to generate power. Gas turbine hot gas path rotating blades, and in particular the blade tips, require cooling during operation. In addition, gas turbine hot gas path nozzles may require cooling during operation. Significant amounts of air may be used for cooling the blades and nozzles. However, overall efficiency of the gas turbine system can be increased if the extent of air used for cooling is reduced. Turbine blades and nozzles are commonly manufactured as monolithic structures using an investment casting process. The investment casting process presents a number of challenges for achieving advanced heat transfer designs in certain areas, e.g., the blade tip, or the leading and/or trailing edge of the nozzle and/or blade. One approach to address these challenges is to manufacture a part of the airfoil, e.g., tip or edge coupon, separately and attach it to the rest of the airfoil, e.g., the airfoil body of a blade or nozzle. In this manner, advanced cooling arrangements can be implemented in, for example, the blade tip or nozzle airfoil leading or trailing edge, and put into practice in both new and used components. One challenge with using separate tips or coupons that are later attached is adequately coupling the part to the rest of the airfoil of the blade or nozzle. Current practices include welding, brazing and bonding.

BRIEF DESCRIPTION OF THE INVENTION

A first aspect of the disclosure provides a blade for a turbomachine, the blade comprising: an airfoil body including at least one first coolant passage, and a tip retention member seat in or on the airfoil body; and a tip having a shape at least partially configured for coupling to the airfoil body, the tip including: a tip body; at least one second coolant passage in the tip body configured for fluid communication with the at least one first coolant passage in the airfoil body; and a retention member extending from the tip body for coupling to the tip retention member seat in the airfoil body.

A second aspect of the disclosure provides a method of forming a blade for a turbomachine, the method comprising: providing an airfoil body including at least one first coolant passage therein; and providing a first tip having a shape at least partially configured for coupling to the airfoil body, the first tip including: a tip body, at least one second coolant passage in the tip body, and at least one retention member extending from the tip body for coupling to at least one retention member seat in the airfoil body; and coupling the first tip to the airfoil body such that the at least one second coolant passage is in fluid communication with the at least one first coolant passage in the airfoil body, and the at least one retention member couples to the at least one retention member seat in the airfoil body.

A third aspect of the disclosure provides a tip for a blade of a turbomachine, the tip comprising: a tip body having a shape at least partially configured for coupling to an airfoil body of the blade; at least one coolant passage in the tip body configured for fluid communication with at least one coolant passage in the airfoil body; and a retention member extending from the tip body for coupling to a tip retention member seat in the airfoil body.

A fourth aspect of the disclosure provides an airfoil for a blade or nozzle of a turbomachine, the airfoil comprising: an airfoil body including at least one first coolant passage, and an edge opening in a leading edge or a trailing edge of the airfoil body, the edge opening having an edge coupon retention member seat in or on an inner surface of the airfoil body; and an edge coupon having a shape at least partially configured for coupling to the edge opening in the airfoil body, the edge coupon including: an edge coupon body, at least one second coolant passage in the edge coupon body configured for fluid communication with the at least one first coolant passage in the airfoil body, and a retention member extending from the edge coupon body for coupling to the edge coupon retention member seat in the airfoil body.

A fifth aspect of the disclosure provides a method of forming an airfoil for a blade or nozzle of a turbomachine, the method comprising: providing an airfoil body including at least one first coolant passage therein and an edge opening in a leading edge or a trailing edge of the airfoil body, the edge opening having at least one edge coupon retention member seat in or on an inner surface of the airfoil body; and providing a first edge coupon having a shape at least partially configured for coupling to the edge opening in the airfoil body, the first edge coupon including: an edge coupon body, at least one second coolant passage in the edge coupon body, and at least one retention member extending from the edge coupon body for coupling to at least one retention member seat in the edge opening in the airfoil body; and coupling the first edge coupon to the airfoil body such that the at least one second coolant passage is in fluid communication with the at least one first coolant passage in the airfoil body, and the at least one retention member couples to the at least one retention member seat in the edge opening in the airfoil body.

A sixth aspect of the disclosure provides an edge coupon for a nozzle or blade of a turbomachine, the edge coupon comprising: an edge coupon body having a shape at least partially configured for coupling to an opening in a leading edge or a trailing edge of an airfoil body of the nozzle or the blade; at least one coolant passage in the edge coupon body configured for fluid communication with at least one coolant passage in the airfoil body; and a retention member extending from the edge coupon body for coupling to an edge coupon retention member seat in the edge opening in the airfoil body.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 6 shows a partial cross-sectional perspective view of an attachment of a blade tip to an airfoil body using a retention member and retention member seat attachment, according to embodiments of the disclosure.

FIG. 7 shows a side view of a blade tip and airfoil body using a retention member and retention member seat attachment, according to an alternative embodiment of the disclosure.

FIG. 8 shows a perspective view of a tip body attached to an airfoil body to form a blade for a turbomachine using a retention member and retention member seat attachment, according to embodiments of the disclosure.

FIG. 9 shows a perspective view of an illustrative nozzle with edge coupons attached using a retention member and retention member seat attachment, according to embodiments of the disclosure.

FIG. 12 shows an exploded side view of an illustrative nozzle including an edge coupon for a trailing edge thereof, according to an embodiment of the disclosure.

FIG. 13 shows a side view of an illustrative nozzle including an edge coupon in the trailing edge thereof, according to an embodiment of the disclosure.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

Figure 1:
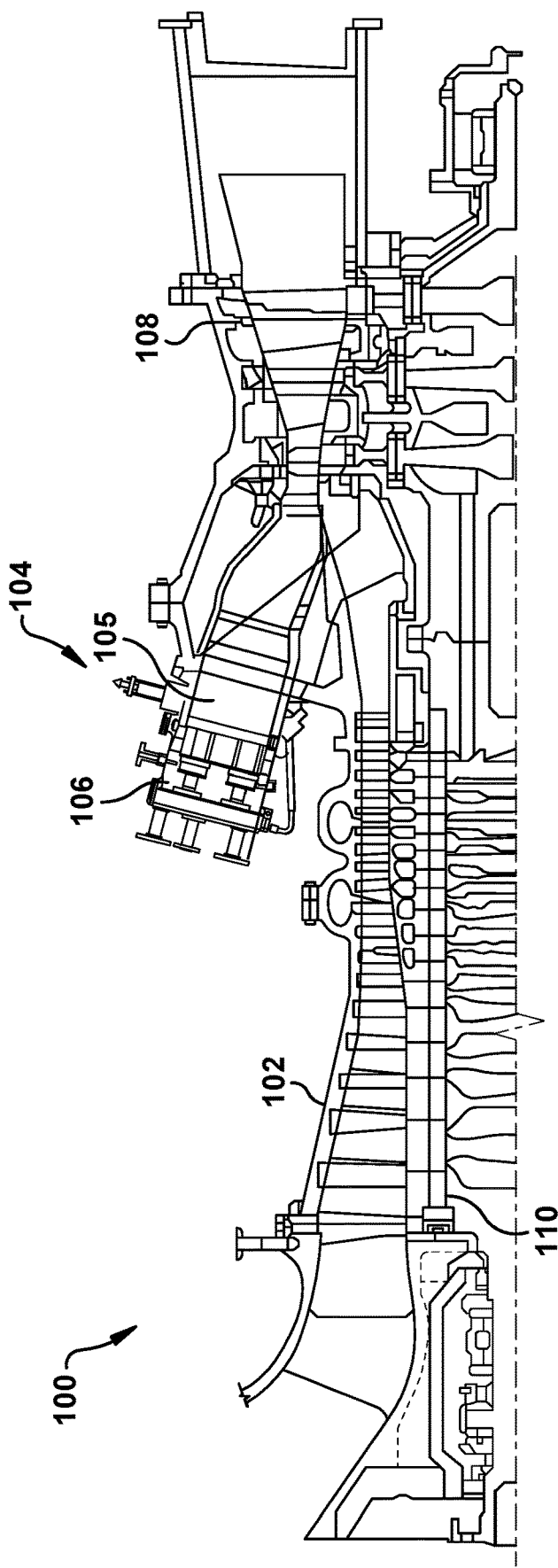
FIG. 1 is a schematic drawing of a conventional gas turbine system.

As an initial matter, in order to clearly describe the current disclosure it will become necessary to select certain terminology when referring to and describing relevant machine components within a blade for a turbomachine. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the gas turbine system, and "aft" referring to the rearward or turbine end of the gas turbine system. It is often required to describe parts that are at differing radial positions with regard to a center axis. The term "radial" refers to movement or position perpendicular to an axis. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the rotor of the gas turbine system.

Where an element or layer is referred to as being "on," "engaged to," "disengaged from," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Embodiments of the disclosure provide an attachment for part of an airfoil, such as a tip for a blade, or an edge coupon for a nozzle or blade. The airfoil may be used in, for example, a turbomachine. In one embodiment, the disclosure provides a blade for a turbomachine, a tip for a blade of a turbomachine and a related method for attaching the tip. The blade may include a tip body having a shape at least partially configured for coupling to an airfoil body of the blade. At least one coolant passage is positioned in the tip body and configured for fluid communication with at least one coolant passage in the airfoil body. A retention member extends from the tip body for coupling to a tip retention member seat in the airfoil body.

In another embodiment, the retention member and retention member seat attachment are applied to an edge coupon for an airfoil for a nozzle or blade of a turbomachine. This embodiment provides an airfoil for a nozzle or blade of a turbomachine, an edge coupon for an airfoil and a related method. In this embodiment, the airfoil includes an airfoil body including at least one first coolant passage, and an edge opening in a leading edge or a trailing edge of the airfoil body. Similar to the first embodiment, the edge opening has an edge coupon retention member seat in or on an inner surface of the airfoil body. The airfoil also includes an edge coupon having a shape at least partially configured for coupling to the edge opening in the airfoil body. The edge coupon includes an edge coupon body, at least one second coolant passage in the edge coupon body configured for fluid communication with the at least one first coolant passage in the airfoil body, and a retention member extending from the edge coupon body for coupling to the edge coupon retention member seat in the airfoil body.

FIG. 1 shows a schematic illustration of an illustrative gas turbine system 100. Gas turbine system 100 includes a compressor 102 and a combustor 104. Combustor 104 includes a combustion region 105 and a fuel nozzle assembly 106. Engine 100 also includes a turbine 108 and a common compressor/turbine rotor 110. In one embodiment, engine 100 is a MS7001FB engine, sometimes referred to as a 9FB engine, commercially available from General Electric Company, Greenville, S.C. The present disclosure is not limited to any one particular engine and may be implanted in connection with other engines including, for example, the MS7001FA (7FA) and MS9001FA (9FA) engine models of General Electric Company.

In operation, air flows through compressor 102 and compressed air is supplied to combustor 104. Specifically, the compressed air is supplied to fuel nozzle assembly 106 that is integral to combustor 104. Fuel nozzle assembly 106 is in flow communication with combustion region 105. Fuel nozzle assembly 106 is also in flow communication with a fuel source (not shown in FIG. 1) and channels fuel and air to combustion region 105. Combustor 104 ignites and combusts fuel. Combustor 104 is in flow communication with turbine 108 in which gas stream thermal energy is converted to mechanical rotational energy. Turbine 108 is rotatably coupled to and drives rotor 110. Compressor 102 also is rotatably coupled to rotor 110. In the illustrative embodiment, there is a plurality of combustors 104 and fuel nozzle assemblies 106. In the following discussion, unless otherwise indicated, only one of each component will be discussed.

Figure 2:
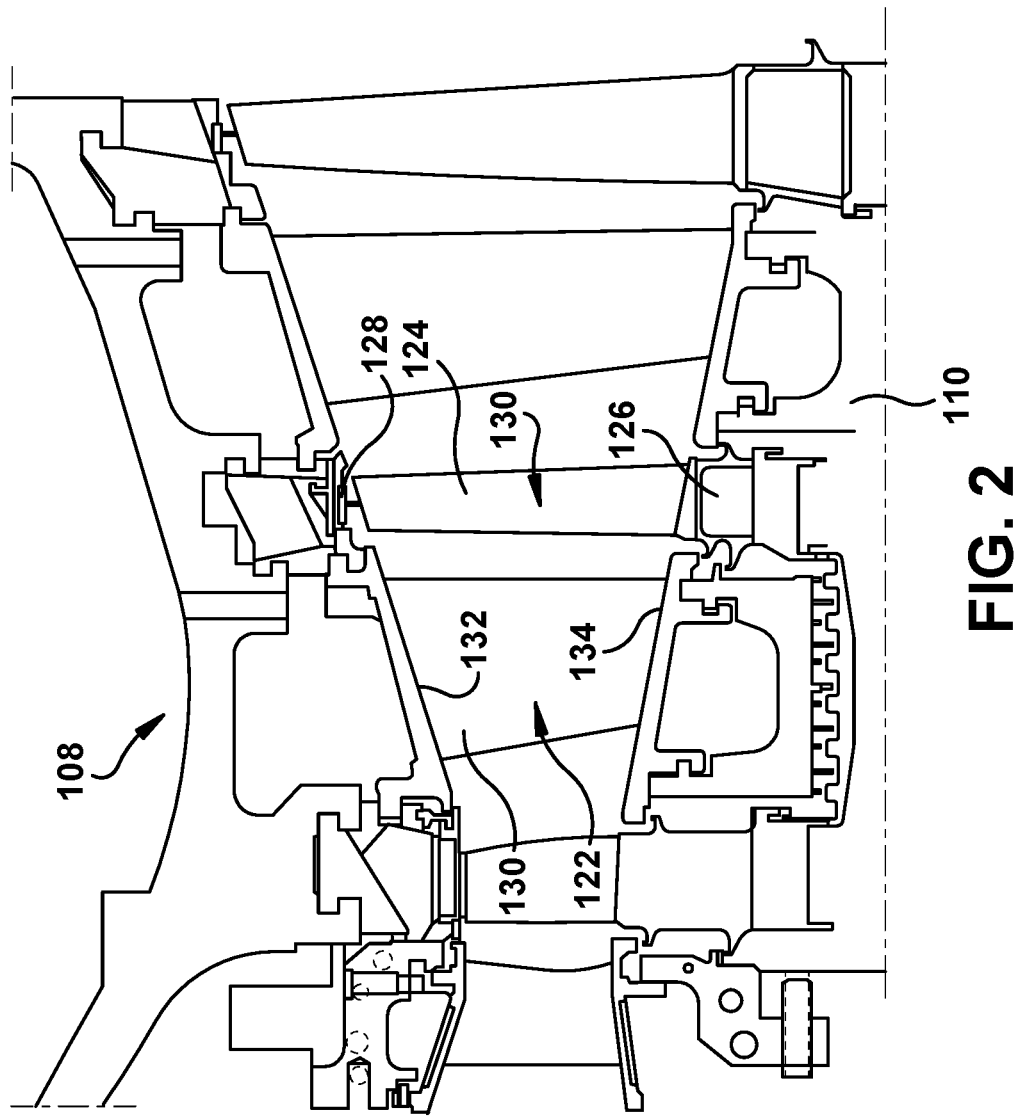
FIG. 2 is a cross-section illustration of a gas turbine assembly that may be used with the gas turbine system in FIG. 1.

FIG. 2 is cross-section illustration of an illustrative turbine 108 showing a rotating blade 120 coupled to rotor 110, and a nozzle 122 that may be used with gas turbine system 100 in FIG. 1. Rotating blade 120 includes an airfoil body 124, a root end 126 for coupling to rotor 110, and a blade tip or shroud 128 at an outer end thereof. Nozzle 122 includes an airfoil body 130 held in turbine 108 by a radially outer platform 132. Nozzle 112 also includes a radially inner platform 134.

The disclosure generally includes two alternative embodiments that employ a retention member and retention member seat attachment for coupling a part to an airfoil of a blade or nozzle. The first embodiment relates to a tip attachment for a blade, while the second embodiment relates to an edge coupon attachment applicable to a leading and/or trailing edge of blades and/or nozzles. Thus, the first embodiment is described relative to a blade alone, while the second embodiment is described relative to a blade and nozzle, interchangeably.

Figure 3:
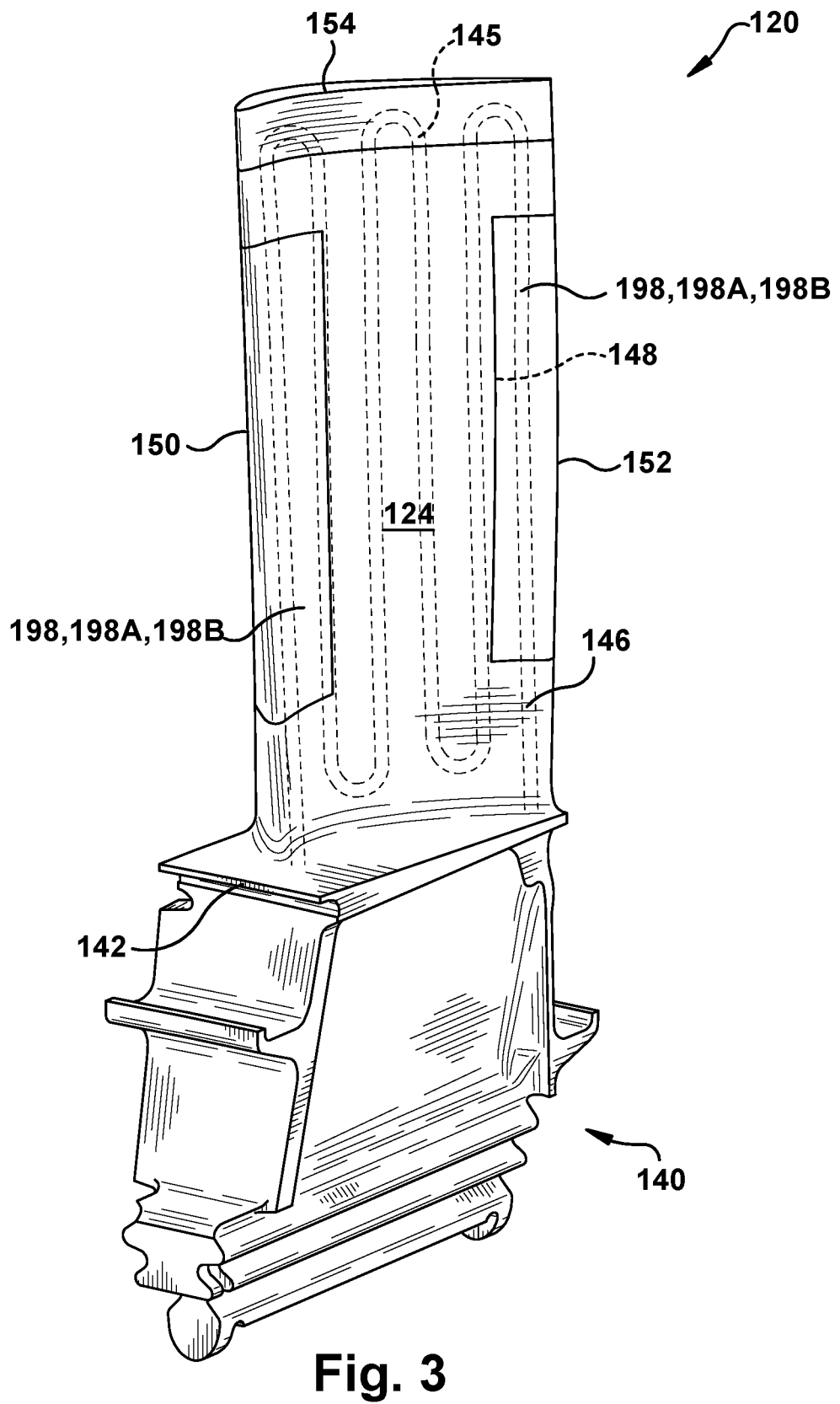
FIG. 3 shows a perspective view of a blade for a turbomachine of the type in which various embodiments of the disclosure may be employed.

FIG. 3 shows a perspective view of a blade 120 for a turbomachine of the type in which the various embodiments of the disclosure may be employed. Blade 120 may include an airfoil body 124 including at least one first coolant passage 145 (in phantom) therein. Blade 120 may also include a root 140 by which blade 120 attaches to rotor 110 (FIG. 2). Root 140 may include a dovetail configured for mounting in a corresponding dovetail slot in the perimeter of the rotor disc. Root 140 may further include a shank that extends between the dovetail and a platform 142, which is disposed at the junction of airfoil body 124 and root 140 and defines a portion of the inboard boundary of the flow path through turbine 108 (FIG. 1). It will be appreciated that airfoil body 124 is the active component of blade 120 that intercepts the flow of working fluid and induces the rotor disc to rotate. It will be seen that airfoil body 124 of blade 120 includes a concave pressure side (PS) outer wall 146 and a circumferentially or laterally opposite convex suction side (SS) outer wall 148 extending axially between opposite leading and trailing edges 150, 152, respectively. Walls 146 and 148 also extend in the radial direction from platform 142 to a tip 154. As understood in the field, coolant passage(s) 145 can have a variety of shapes such as but not limited to: linear, sinusoidal (FIG. 8), etc. Coolant passage(s) 145 can deliver a coolant, e.g., air from compressor 102 (FIG. 1), through airfoil body 124 and/or to tip 154.

Figure 4:
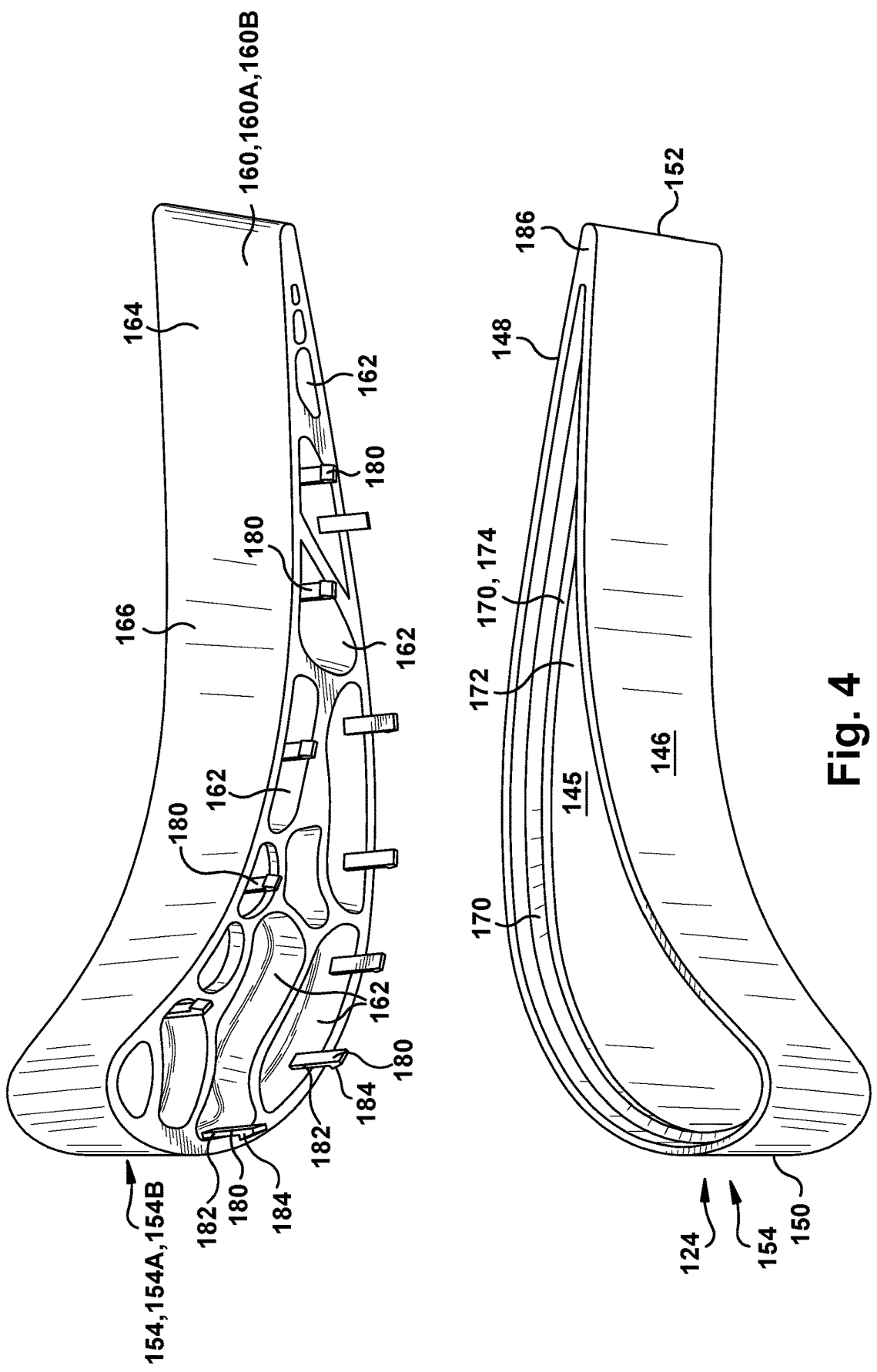
FIG. 4 shows an exploded perspective view of a blade and a blade tip using a retention member and retention member seat attachment, according to embodiments of the disclosure.

Referring to the exploded perspective view of FIG. 4, tip 154 has a shape that is at least partially configured for coupling to airfoil body 124, i.e., at least part of tip 154 has a commensurate shape to airfoil body 124 so, collectively, they can form a unitary blade 120, when coupled. Tip 154 may include a tip body 160. Tip body 160 can be solid, or as shown, include at least one coolant passage 162 therein configured for fluid communication with coolant passage(s) 145 in airfoil body 124. Tip body 160 can include a complete tip, a portion of a complete tip, or multiple portions of a tip. Coolant passage(s) 162 may have a large variety of shapes and paths to cool tip body 160 including a base 164 and/or a rail 166 (FIG. 7) thereof. Further, coolant passage(s) 162 can pass through any part of tip 154, e.g., a body, a tip plate, a tip rail, etc. Coolant passage(s) 145 and 162 do not need to have a one-to-one correspondence.

Figure 5:
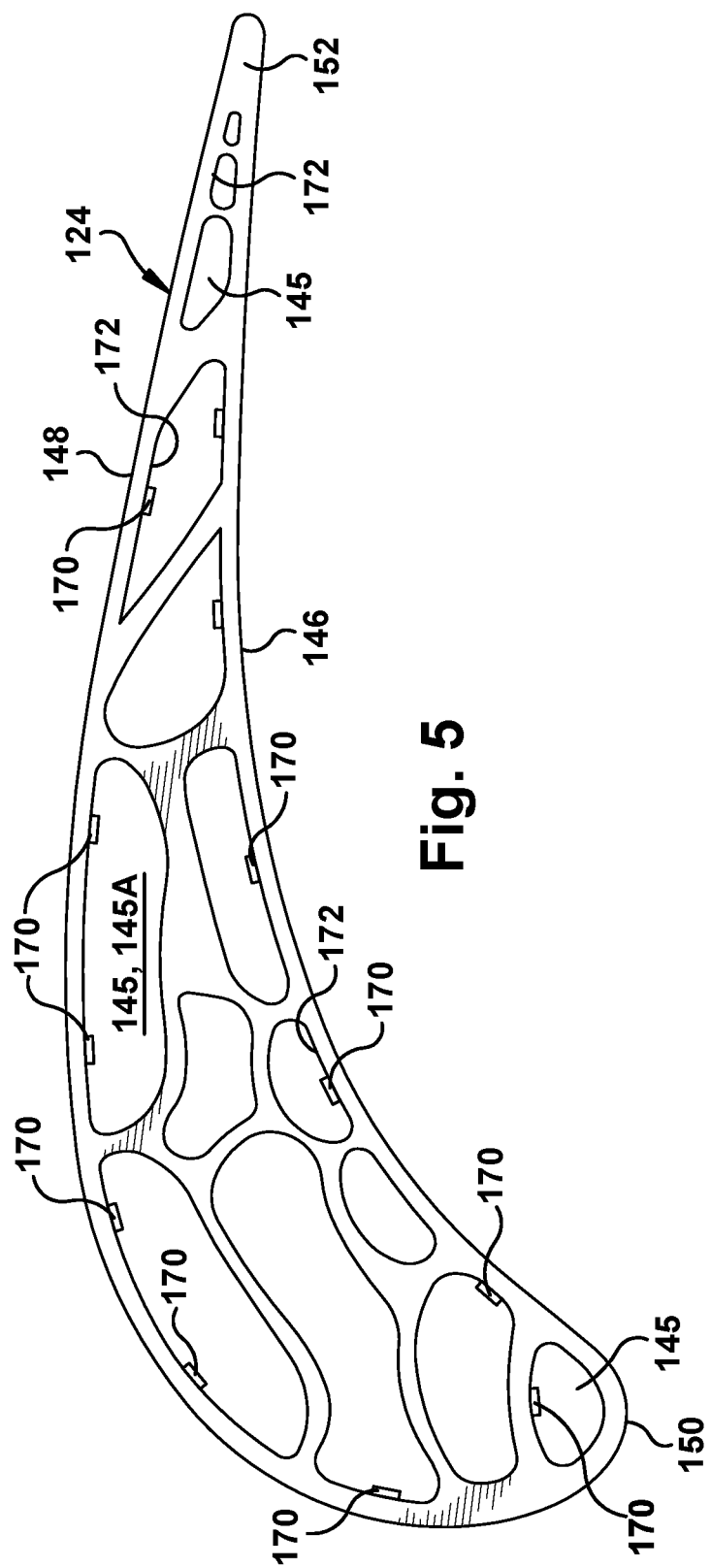
FIG. 5 shows a cross-sectional view of a blade tip including a retention member, according to an embodiment of the disclosure.

With continuing reference to FIG. 4, in accordance with embodiments of the disclosure and in contrast to conventional tip-blade attachment arrangements, airfoil body 124 includes a tip retention member seat 170 in or on airfoil body 124. In the embodiment shown in FIG. 4, tip retention member seat 170 is on an inner surface 172 of airfoil body 124, i.e., either extending from or in inner surface 172. Here, tip retention member seat 170 may include a protrusion or ridge 174 extending inwardly from inner surface 172 of a wall of airfoil body 124. In FIG. 4, tip retention member seat 170 includes ridge 174 that extends entirely about inner surface 172. Although shown as a continuous ridge 174, it is understood that seat 170 may be segmented. For example, in FIG. 4, inner surface 172 is shown as defining a single coolant passage 145, but it is understood that coolant passage 145 may include a number of coolant passages 145. In this latter case, tip retention member seat 170 may be segmented, i.e., includes a number of seats 170 within respective coolant passages 145. For example, as shown in FIG. 5, airfoil body 124 may include a number of coolant passages 145, each with one or more tip retention member seats 170 on inner surfaces 172 thereof, i.e., extending into or facing respective coolant passages 145. Ridge 174 may be discontinuous along an inner surface 172 of any particular coolant passage, e.g., as in coolant passage 145A in FIG. 5.

FIG. 4 also shows tip 154 including a retention member(s) 180 extending from tip body 160 for coupling to tip retention member seat(s) 170. In one embodiment, retention member 180 may include a flexible element 182 having a retention seat engaging element 184 at a distal end thereof for engaging with tip retention member seat 170 on inner surface 172 of airfoil body 124. As shown in FIG. 6, each retention member 180 may be configured to extend into a coolant passage 145 in airfoil body 124 to engage a tip retention member seat 170. Any number of retention member seats 170 spaced about airfoil body 124 may be employed. Similarly, any number of corresponding retention members 180 spaced about tip 154 may be used to engage retention member seats 170.

Flexible element 182 may be sufficiently flexible to allow retention seat engaging element 184 to flex and pass into engagement with tip retention member seat 170, but rigid enough to hold the two together. A length of each retention member 180 may be configured to ensure tip 154 is tightly held to airfoil body 124. A brazing material 186 may also be provided for coupling tip 154 to airfoil body 124 along at least mating surfaces of tip body 160 and airfoil body 124. Brazing material 186 may include any known or later developed brazing or welding material used to fixedly couple tip to an airfoil body such as but not limited to: AMS4777, AMS4782, DF4B, D15, BNi-9, or AMS4783. Differential heating and different coefficient of thermal expansion (CTE) between materials may be used to enable a robust retention arrangement. Differential heating may be used during assembly of tip 154 to airfoil body 124. For example, airfoil body 124 could be heated to allow easy insertion of tip 154. Upon cooling, gaps will close and provide intimate contact between the parts. Similarly, in another example, the material of tip 154 can be designed to have a slightly lower CTE than airfoil body 124 to enable assembly.

Referring to FIGS. 4-8, a method of forming blade 120 for a turbomachine will now be described. Airfoil body 124 may be provided including at least one first coolant passage 145 therein. Further, airfoil body 124 may include a retention member seat 170, such as ridge 174, extending inwardly from inner surface 172 of a previously manufactured airfoil body 124. Ridge 174 may be discontinuous on inner surface 172 of airfoil body 124. As shown in FIG. 6, in one embodiment, airfoil body 124 may also be manufactured with retention member seat 170 as an integral ridge 174 extending inwardly from inner surface 172 of airfoil body 124.

Tip 154A may also have a shape at least partially configured for coupling to airfoil body 124. Tip 154A may include tip body 160, coolant passage(s) 162 therein, and retention member(s) 180 extending from tip body 160 for coupling to retention member seat(s) 170 in airfoil body 124. Each retention member 180 may include flexible element 182 having retention seat engaging element 184 at a distal end thereof for engaging with one of retention member seat(s) 170 of airfoil body 124.

FIG. 8 shows coupling tip 154A to airfoil body 124 such that coolant passage(s) 162 is/are in fluid communication with coolant passage(s) 145 in airfoil body 124. As explained herein, and as shown best in FIG. 6, at least one retention member 180 couples to at least one retention member seat 170 in airfoil body 124 to couple tip 154A to airfoil body 124. Each retention member 180 may flex as its retention seat engaging element 184 passes over inner surface 172 of airfoil body 124, and/or ridge 174. A mating or engaging surfaces may be slanted to assist in the necessary application of bending force and alignment of parts. The coupling can also include metallurgically coupling tip 154A to airfoil body 124, e.g., with brazing material 186, along at least portions of mating surfaces of tip body 160A and airfoil body 124, once element 184 and seat 170 are mated. In one embodiment, the metallurgical coupling may include heating tip 154A and airfoil body 124, pressing tip body 160A to airfoil body 124, e.g., with a force F assisted by retention member 180 interaction with seat 170, and brazing tip body 160A to airfoil body 124. Alternatively, the same process can be performed at room temperature, depending on the materials and the tip/airfoil body arrangement. Brazing material 186 can optionally be pre-placed at the joint interface prior to assembly. For example, brazing material 186 could be deposited using various deposition methods on to mating surface(s), and then prepped prior to assembly. As noted, brazing material 186 may include any now known or later developed brazing or welding material used to fixedly couple tip to an airfoil body, see list herein. The force may be applied either at or close to bonding temperature to enable locking of tip 154A to airfoil body 124.

Referring to FIGS. 6 and 7, in another embodiment, two or more retention member seats 170, or sets thereof, may be provided in an airfoil body 124 at different lengthwise positions, e.g., at different radial positions in airfoil body 124 from root 140 (FIG. 3). For example, a first retention member seat 170A may be positioned at a first lengthwise position R1 on airfoil body 124, and a second retention member seat 170B may be positioned at a second, different lengthwise position R2 on airfoil body 124. In this fashion, a first tip 154A may be coupled to airfoil body 124, and can be removed after use, e.g., by cutting away a distal end 188 of airfoil body 124 to which tip 154A is coupled. The cutting can be made using any now known or later developed metal cutting process, e.g., laser cutting, water jet, electro-discharge machining. Distal end 188 includes first retention member seat 170A such that cutting it away removes tip 154A and its related seat, but leaves second retention member seat 170B. Thereafter, another tip 154B (FIG. 7) may be coupled to airfoil body 124 by coupling at least one retention member 180 thereof to second retention member seat 170B in airfoil body 124. Coupling of tip 154B may be completed as described for tip 154A. It is understood that a distance between a new distal end 190 of airfoil body 124 and second retention member seat 170B is precisely controlled to ensure proper engagement of retention member 180 of tip 154B, e.g., by cutting accuracy, machining, etc. Since tip 154A can be replaced, tip 154B may allow for changes in coolant passages 162 in the tip of a blade. For example, coolant passage(s) 162 in tip 154B can be more advanced, e.g., more precise in path, more numerous, smaller or larger, etc., to provide better cooling than tip 154A.

FIGS. 3 and 9-15 show various drawings of a second embodiment of the disclosure in which an edge coupon 198 is attached using a retention member and retention member seat attachment on a blade 120 and/or a nozzle 122. For purposes of description, edge coupon 198 attachment will illustrated mostly relative to a nozzle 122, but as noted above, the second embodiment is described relative to nozzle 122 and blade 120 collectively, e.g., with reference to leading and trailing edges thereof collectively, or with reference to airfoil bodies thereof collectively. That is, edge coupon 198 attachment is equally applicable leading or trailing edges of nozzle 122 or blade 120. It is noted that FIG. 3 shows blade 120 including an edge coupon 198 in a leading edge 150 thereof, and an edge coupon 198 in trailing edge 152 thereof. It is emphasized that only one edge coupon can also be employed in blade 120.

With further regard to nozzle 122, FIG. 9 shows a perspective view of an illustrative stationary vane or nozzle 122 of the type in which the present embodiment may be employed. As noted previously, nozzle 122 includes airfoil body 130 held in turbine 108 (FIG. 2) by radially outer platform 132. Outer platform 132 may include any now known or later developed mounting configuration for mounting in a corresponding mount in the casing. Nozzle 122 may further include inner platform 134 for positioning between adjacent turbine rotor blades 120 (FIG. 2). Platforms 132, 134 define respective portions of the outboard and inboard boundary of the flow path through turbine 108. It will be appreciated that airfoil body 130 is the active component of nozzle 122 that intercepts the flow of working fluid and directs it towards turbine rotor blades 120 (FIG. 2). It will be seen that airfoil body 130 of nozzle 122 includes a concave pressure side (PS) outer wall 200 and a circumferentially or laterally opposite convex suction side (SS) outer wall 202 extending axially between opposite leading and trailing edges 204, 206, respectively. Sidewalls 200 and 202 also extend in the radial direction from platform 132 to platform 134. Nozzle 122 and/or airfoil body 130 may include at least one first coolant passage 210 (in phantom) therein. As understood in the field, coolant passage(s) 210 can have a variety of shapes such as but not limited to: linear, sinusoidal (FIG. 9), etc. Coolant passage(s) 200 can deliver a coolant, e.g., air from compressor 102 (FIG. 1), through airfoil body 130, coupon(s) 198, and/or platforms 132, 134.

Figure 10:
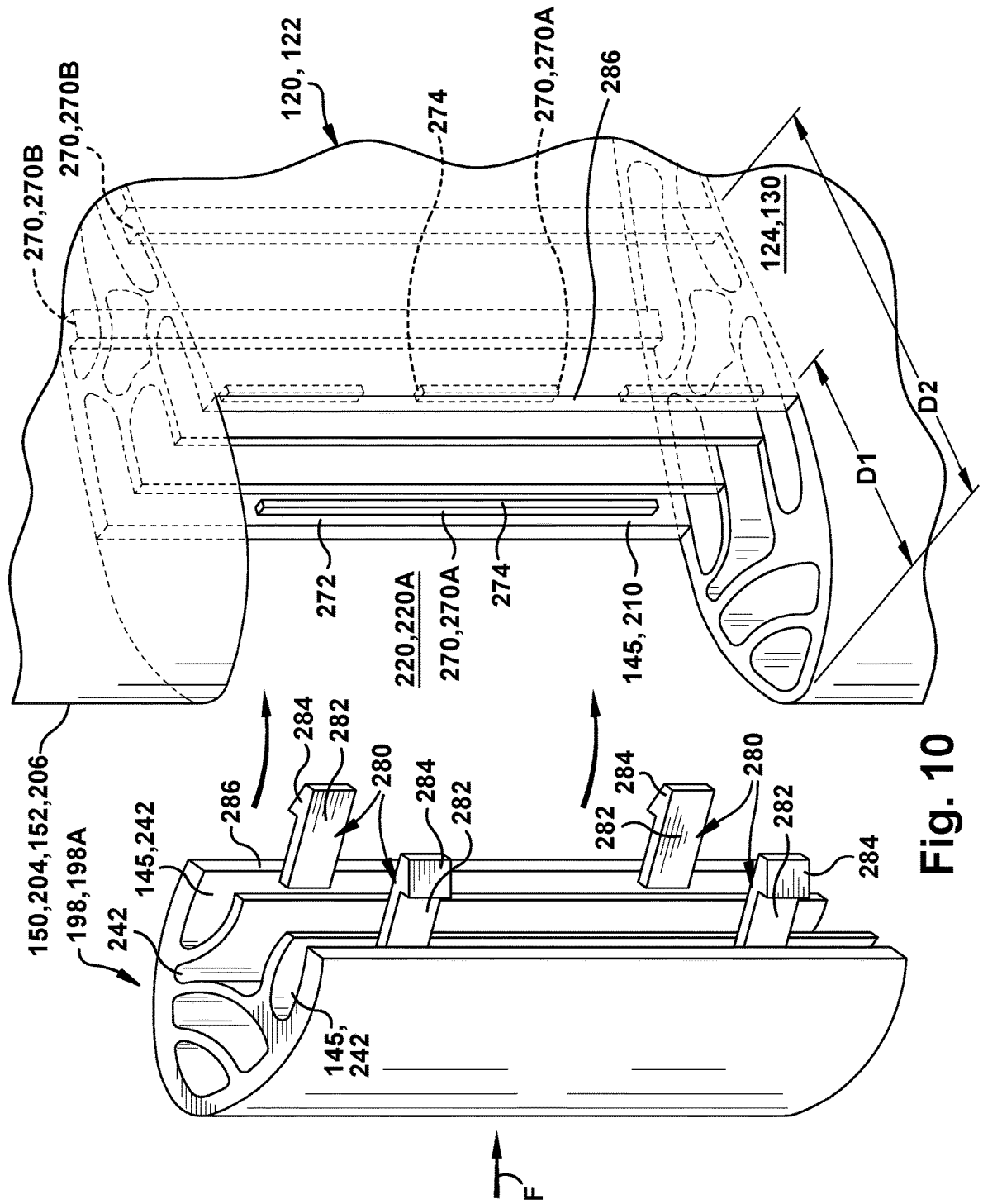
FIG. 10 shows an exploded schematic, perspective view of an edge coupon including a retention member for attachment in a leading or trailing edge of a blade or nozzle, according to embodiments of the disclosure.

FIG. 10 shows a schematic view of an airfoil for blade 120 or nozzle 122 of turbomachine 100 according to the present embodiment. FIG. 10 shows a schematic view of any edge 150, 204; 152, 206, i.e., leading or trailing edge, of the airfoil of blade 120 or nozzle 122. As illustrated, the airfoil can include airfoil body 124, 130 including at least one first coolant passage 145, 210, and an edge opening 220 in leading edge 150, 204 or a trailing edge 152, 206 of airfoil body 124, 130. Edge opening 220 has an edge coupon retention member seat 270 in or on an inner surface 272 of airfoil body 124, 130.

Edge coupon retention member seat 270, e.g., 270A, 270B, may either extend from, or be located, in inner surface 272. Here, coupon retention member seat(s) 270 may include a protrusion or ridge 274 extending inwardly from inner surface 272 of a wall of airfoil body 124, 130. In the left side of FIG. 10, coupon retention member seat(s) 270 includes ridge 274 that extends substantially an entire length of cooling passage 145, 210 exposed by edge opening 220. Although shown as a continuous ridge 274, it is understood that seat(s) 270 may be segmented. That is, each coupon retention member seat 270 (270A, 270B) may be segmented to include a number of spaced seats 270 within respective coolant passages 145, 210. Ridge 274 may be discontinuous along an inner surface 272 of any particular coolant passage 145, 210, e.g., the ridges 274 in phantom in the right side of FIG. 10 is segmented. In this manner, the retention member seat(s) 270 may include a plurality of retention member seats spaced about edge opening 220 in airfoil body 124, 130. In addition, and as will be described in greater detail herein, a number of retention member seat(s) 270 may be axially spaced relative to a leading edge 150, 204 or trailing edge 152, 206 of airfoil body 124, 130, respectively.

FIG. 10 also shows a schematic view of an edge coupon 198 having a shape at least partially configured for coupling to edge opening 220 in airfoil body 124, 130. Edge coupon 198 can include any now known or later developed form of edge structure for an airfoil that is added into a previously manufactured part with edge opening 220, or replaces part of a previously manufactured airfoil having edge opening 220 formed therein, e.g., after use. Edge coupon 198 includes an edge coupon body 240, and at least one second coolant passage 242 in edge coupon body 240. Second cooling passage(s) 242 may be configured for fluid communication with first coolant passage(s) 210 in airfoil body 124, 130. Second cooling passage(s) 242 may communicate with first coolant passage(s) 210 in an aligned linearly fashion, or may join together to collectively form a coolant passage. Edge coupon 198 may also include a retention member 280 extending from edge coupon body 240 for coupling to edge coupon retention member seat 270 in airfoil body 124, 130.

Retention member 280 may be similar to retention member 180 (FIG. 4). In one embodiment, retention member 280 may include a flexible element 282 having a retention seat engaging element 284 at a distal end thereof for engaging with tip retention member seat 270 on inner surface 272 of airfoil body 124, 130. As shown in FIG. 10, each retention member 280 may be configured to extend into coolant passage 210 in airfoil body 124, 130 to engage a tip retention member seat 270. Any number of retention member seats 270 spaced about airfoil body 124, 130 may be employed. Similarly, any number of corresponding retention member(s) 280 spaced about edge coupon 198 may be used to engage retention member seat(s) 270.

Flexible element 282 may be sufficiently flexible to allow retention seat engaging element 284 to flex and pass into engagement with tip retention member seat 270, but rigid enough to hold the two together. A length of each retention member 280 may be configured to ensure edge coupon 198 is tightly held to airfoil body 124, 130. A brazing material 286 may also be provided for coupling edge coupon 198 to airfoil body 124, 130 along at least mating surfaces of edge coupon 198 and airfoil body 124, 130. Brazing material 286 may include any known or later developed brazing or welding material used to fixedly couple tip to an airfoil body such as but not limited to: AMS4777, AMS4782, DF4B, D15, BNi-9, or AMS4783. Differential heating and different coefficient of thermal expansion (CTE) between materials may be used to enable a robust retention arrangement. Differential heating may be used during assembly of edge coupon 198 to airfoil body 124, 130. For example, airfoil body 124, 130 could be heated to allow easy insertion of edge coupon 198. Upon cooling, gaps will close and provide intimate contact between the parts. Similarly, in another example, the material of edge coupon 198 can be designed to have a slightly lower CTE than airfoil body 124, 130 to enable assembly.

Figure 11:
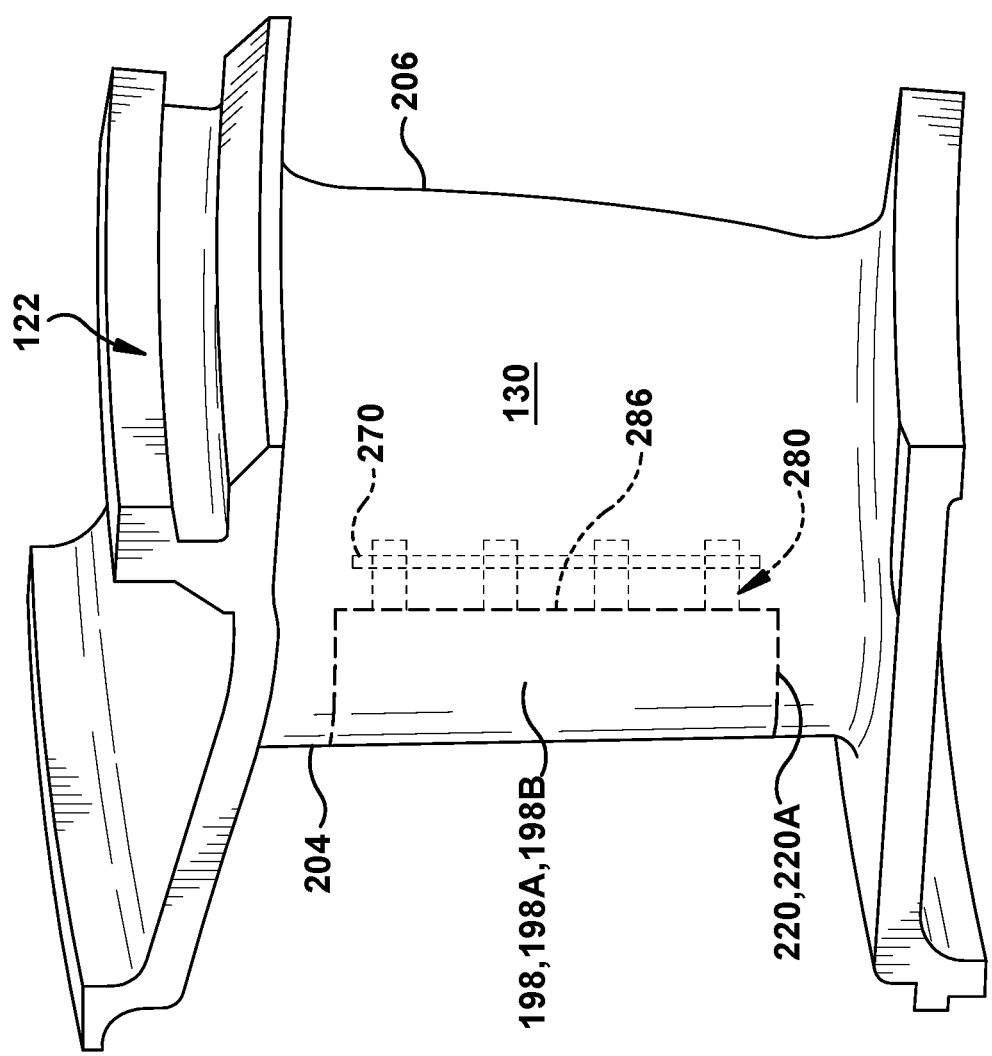
FIG. 11 shows a side view of an illustrative nozzle including an edge coupon in a leading edge thereof, according to an embodiment of the disclosure.
Figure 14:
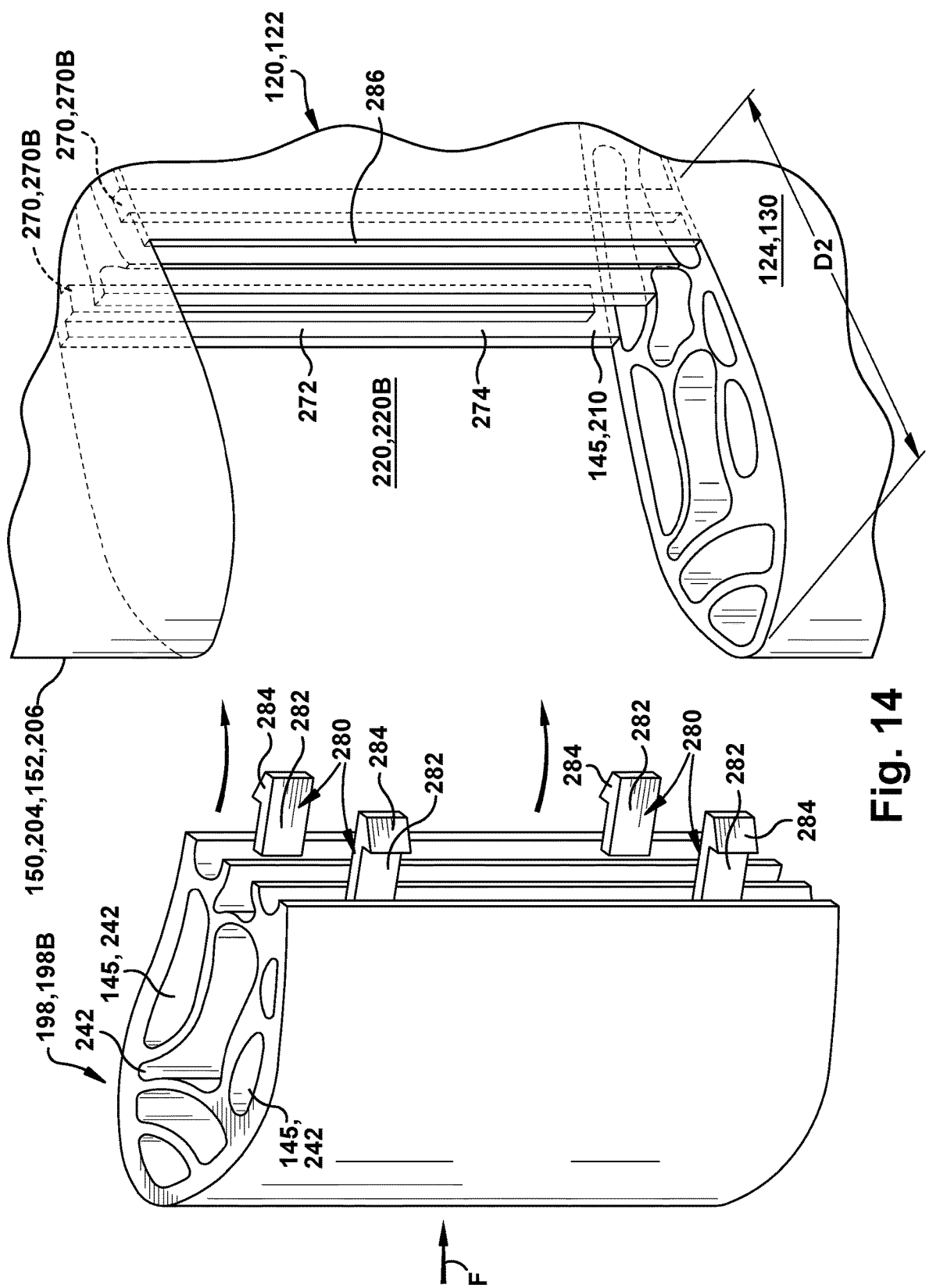
FIG. 14 shows an exploded, schematic perspective view of an edge coupon including a retention member for an edge opening in a leading or trailing edge of a blade or nozzle, according to another embodiment of the disclosure.
Figure 15:
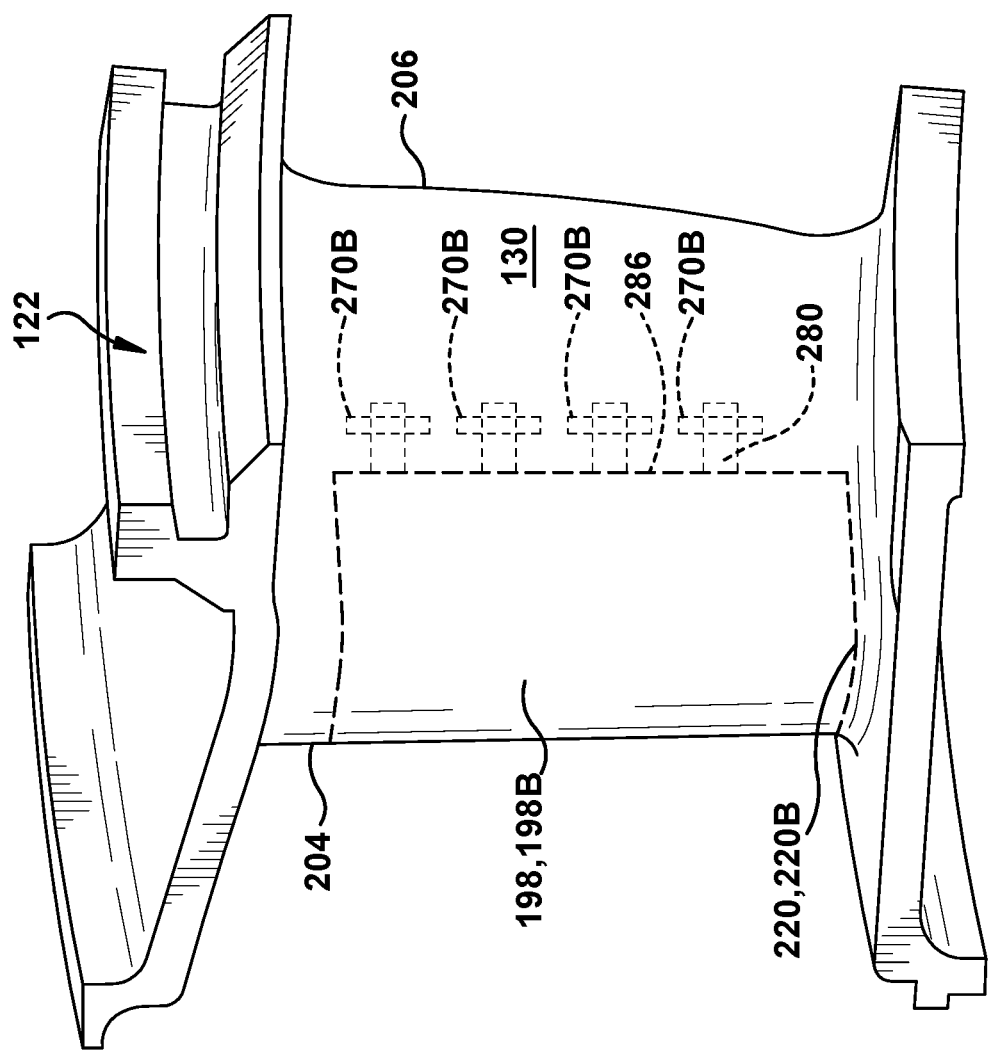
FIG. 15 shows a side view of another edge coupon including a retention member for an axially deeper edge opening in a leading or trailing edge of a blade or nozzle, according to embodiments of the disclosure.

Similar to the multiple radially spaced tip retention seats 170A, 170B for multiple tips 154A, 154B described relative to FIG. 7, airfoil body 124, 130 may also include a number of retention member seats 270A, 270B that are axially spaced relative to the leading edge 150, 204 or trailing edge 152, 206 of airfoil body 124, 130 to allow for different edge coupons 198A, 198B to be employed. As shown in FIG. 10, retention member seat 270 may include a first retention member seat 270A at a first axial depth position D1 relative to leading edge 150, 204 or trailing edge 152, 206 of airfoil body 124, 130, and a second retention member seat 270B at a second, different axial depth D2 position relative to the leading edge 150, 204 or trailing edge 152, 206 of airfoil body 124, 130. As shown in FIGS. 10 and 11, a first edge coupon 198A may be coupled to airfoil body 124, 130 in edge opening 220A. Subsequently, first edge coupon 198A can be removed from airfoil body 124, 130 after use, e.g., by cutting out first edge coupon 198A. The cutting can be made using any now known or later developed metal cutting process, e.g., laser cutting, water jet, electro-discharge machining. As first edge coupon 198A is removed, as shown in FIG. 14, a new edge opening 220B is formed which extends axially deeper into airfoil body 124, 130, removing first retention member seat 270A, but leaving second retention member seat 270B. Thereafter, as shown in FIGS. 14 and 15, another edge coupon 198B may be coupled to airfoil body 124, 130 by coupling at least one retention member 280 thereof to second retention member seat 270B in airfoil body 124, 130. Coupling of second edge coupon 198B may be completed as described for edge coupon 220A. It is understood that a depth of edge opening 220B is precisely controlled to ensure proper engagement of retention member 280 of second edge coupon 198B, e.g., by cutting accuracy, machining, etc. Since first edge coupon 198A can be replaced, second edge coupon 198B may allow for changes in coolant passages 242, 210 in leading edge 150, 204 and/or trailing edge 152, 206 of airfoil body 124, 130. For example, coolant passage(s) 242 in second edge coupon 198B can be more advanced, e.g., more precise in path, more numerous, smaller or larger, etc., to provide better cooling than first edge coupon 198A.

FIG. 9 shows an edge coupon 198 in both leading and trailing edges 204, 206 of nozzle 122; FIG. 11 shows edge coupon 198 in leading edge 204 of nozzle 122, and FIG. 13 shows edge coupon 198 in trailing edge 206 of nozzle 122. FIG. 3 shows edge coupons 198 applied to both leading and trailing edges 150, 152 of blade 120. While shown in both leading edge 150 and trailing edge 152, it is understood that it can be in just one of the edges of blade 120, similar to that shown for nozzle 122.

Referring to FIGS. 10-15, a method of forming an airfoil for blade 120 or nozzle 122 of a turbomachine will now be described. Airfoil body 124, 130 may be provided including at least one first coolant passage 145, 210 therein and an edge opening 220 in leading edge 150, 204 or a trailing edge 152, 206 of airfoil body 124, 130, respectively. That is, airfoil body 124, 130 may include manufacturing the airfoil body with edge opening 220 and the at least one retention member seat 270 as an integral ridge extending inwardly from inner surface 272 of airfoil body 124, 130.

Edge opening 220 has edge coupon retention member seat(s) 270 in or on inner surface 272 of airfoil body 124, 130. Further, airfoil body 124, 130 may include an added retention member seat 270 as ridge 274 extending inwardly from inner surface 272 of a previously manufactured airfoil body 124, 130. Ridge 274 may be discontinuous on inner surface 272 of airfoil body 124, 130.

Edge coupon 198 may also be provided having a shape at least partially configured for coupling to airfoil body 124, 130. Edge coupon 198 may include: an edge coupon body 240, second coolant passage(s) 142 in edge coupon body 240, and retention member(s) 280 extending from edge coupon body 240 for coupling to retention member seat(s) 270 in airfoil body 124, 130. Each retention member 280 may include flexible element 282 having retention seat engaging element 284 at a distal end thereof for engaging with one of retention member seat(s) 270 of airfoil body 124, 130.

FIGS. 3, 11 and 13 show coupling edge coupon 198A to airfoil body 124, 130 such that coolant passage(s) 242 is/are in fluid communication with coolant passage(s) 210 in airfoil body 124, 130. As explained herein, and as shown best in FIGS. 11 and 13, at least one retention member 280 couples to at least one retention member seat 270 in airfoil body 124, 130 to couple edge coupon 198A to airfoil body 124, 130. Each retention member 280 may flex as its retention seat engaging element 284 passes over inner surface 272 of airfoil body 124, 130, and/or ridge 274. A mating or engaging surfaces may be slanted to assist in the necessary application of bending force and alignment of parts. The coupling can also include metallurgically coupling edge coupon 198A to airfoil body 124, 130, e.g., with brazing material 286, along at least mating surfaces of edge coupon 198A and airfoil body 124, 130, once element 284 and seat 270 are mated. In one embodiment, the metallurgical coupling may include heating edge coupon 198A and airfoil body 124, 130, pressing edge coupon body 240 to airfoil body 124, 130, e.g., with a force F assisted by retention member 280 interaction with seat 270, and brazing edge coupon 198A to airfoil body 124, 130. Alternatively, the same process can be performed at room temperature, depending on the materials and edge coupon/airfoil body arrangement. Brazing material 286 can optionally be pre-placed at the joint interface prior to assembly. For example, brazing material 286 could be deposited using various deposition methods on to the surface, and then prepped prior to assembly. As noted, brazing material 286 may include any now known or later developed brazing or welding material used to fixedly couple edge coupon to an airfoil body, see list herein. The force may be applied either at or close to bonding temperature to enable locking of edge coupon 198 to airfoil body 124, 130.

As shown in FIG. 10, providing airfoil body 124, 130 may include providing a first retention member seat 270A at a first depth position D1 in airfoil body 124, 130, and a second retention member seat 270B at a second, different depth position D2 in airfoil body 124, 130. Each depth is relative to a respective leading edge 152, 204 or trailing edge 152, 206. The method may include removing an edge coupon, e.g., edge coupon 198A, from airfoil body 124, 130, the edge coupon coupled 198A coupled to first retention member seat 270A. The removing may include, as shown in FIG. 14, enlarging edge opening 220B, i.e., enlarging the old edge opening 220A to new edge opening 220B, to remove first retention member seat 270A, leaving second retention member seat 270B. Thereafter, as shown in FIG. 15, another edge coupon 198B may be coupled to airfoil body 124, 130, including coupling retention member(s) 280 to second retention member seat(s) 270B in airfoil body 124, 130.

Embodiments of the disclosure may also include edge coupon 198. As shown best in FIG. 10, edge coupon 198 may include edge coupon body 240 having a shape at least partially configured for coupling to edge opening 220 in leading edge 150, 204 or a trailing edge 152, 206 of airfoil body 124, 130 of blade 120, or nozzle 122. Edge coupon 198 includes coolant passage(s) 242 in edge coupon body 240 configured for fluid communication with coolant passage(s) 210 in airfoil body 124, 130. Edge coupon 198 also include retention member(s) 280 extending from edge coupon body 240 for coupling to edge coupon retention member seat(s) 270 in edge opening 220 in airfoil body 124, 130. Retention member 280 may include flexible element 282 having retention seat engaging element 284 at a distal end thereof for engaging with tip retention member seat 270 on inner surface 272 of airfoil body 124, 130. As shown in FIG. 10, each retention member 280 may be configured to extend into a coolant passage 210 in airfoil body 124, 130 to engage a tip retention member seat 270.

Airfoil bodies 124, 130, tip 154 (154A or 154B) and/or edge coupon 198 may include any now known or later developed metal or metal alloy capable of withstanding the operational environment within turbomachine 100, e.g., a superalloy or other material that is highly oxidation resistant and creep resistant. As used herein, "superalloy" refers to an alloy having numerous excellent physical characteristics compared to conventional alloys, such as but not limited to: high mechanical strength, high thermal creep deformation resistance, like R195, Amdry 995, Rene 108, CM247, Haynes alloys, Incalloy, MP98T, TMS alloys, CMSX single crystal alloys. In one embodiment, superalloys for which teachings of the disclosure may be especially advantageous are those superalloys having a high gamma prime (γ') value. "Gamma prime" (γ') is the primary strengthening phase in nickel-based alloys. Example high gamma prime superalloys include but are not limited to: Rene 108, N5, GTD 444, MarM 247 and IN 738. Tip 154 and/or edge coupon 198 may include alloys listed above (i.e., R195, Amdry 995, Rene 108, CM247, Haynes alloys, Incalloy, MP98T, TMS alloys, CMSX single crystal alloys) plus other alloys such as but not limited to: H214, MMC, ODS. Airfoil body 124, 130 may include, for example: Rene N5, Rene N4, Rene 108, GTD111, GTD444, IN738, or CMSX alloys, etc. Airfoil body 124, 130, tip body 160 and/or edge coupon 198 may also include a metal matrix composite (MMC). Airfoil body 124, 130, tip 154 and/or edge coupon 198 may be manufactured using one of investment casting, injection molding or additive manufacturing (e.g., direct metal laser melting (DMLM), electron beam manufacturing (EBM), binder-jetting, etc.).

Figure 17:
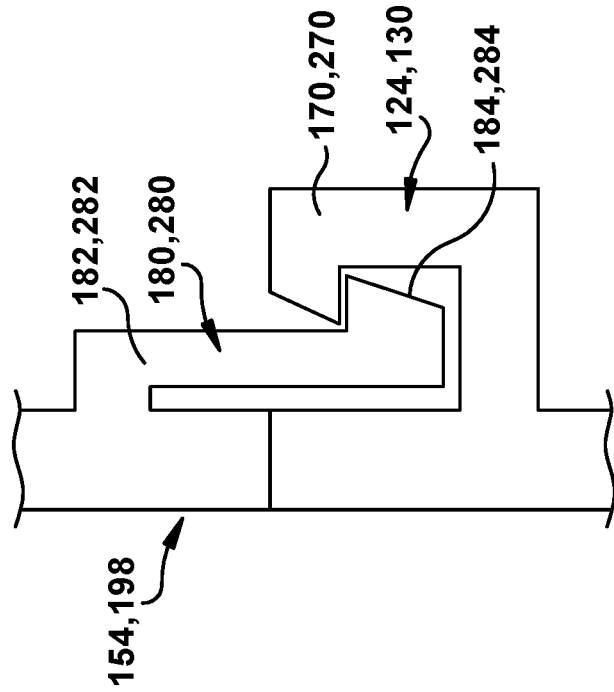
FIG. 17 shows a partial side view of a retention member and retention member seat, according to another alternative embodiment of the disclosure.
Figure 16:
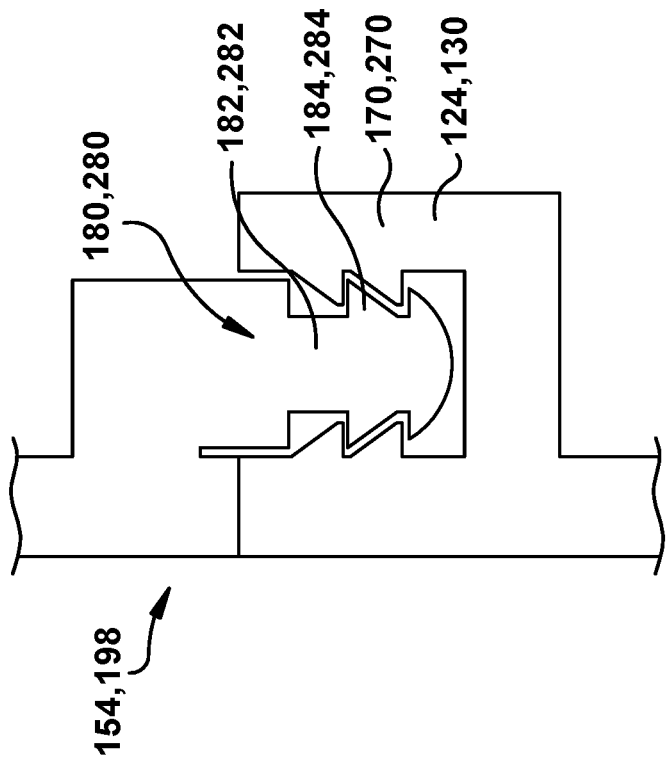
FIG. 16 shows a partial side view of a retention member and retention member seat, according to an alternative embodiment of the disclosure.

Referring to FIGS. 16-17, while a particular form of retention member 180, 280 and retention member seat 170, 270 have been illustrated, there are a wide variety of alternative embodiments. For example, FIG. 16 shows, for example, a tip 154 or edge coupon 198 with a multiple fingered, tip retention member 180, 280 including a flexible element 182, 282 and retention seat engaging elements 184, 284 in mating retention seat(s) 170, 270 in airfoil body 124, 130. FIG. 17 shows a different form of retention seat 170, 270 on airfoil body 124, 130. In any of the embodiments described herein, it is recognized that the male and female part position may be reversed, where possible.

The disclosure provides advanced heat transfer airfoil coupon and/or tip arrangements that are not possible/easy to manufacture via investment casting. As described, the tip and/or coupon may be manufactured as a separate piece and then joined to the airfoil body. The advanced heat transfer arrangement may reduce cooling air flow, increasing gas turbine efficiency—lower fuel cost/higher power generation, and/or the life of the component. The retention feature also reduces the risk of part failure and separation during operation, and allows for replacement or upgrading of used parts. The new or replacement parts can include more advanced cooling passages than the previous part, allowing for improvement in the cooling of the tip, and/or leading and/or trailing edge.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. An airfoil for a blade or nozzle of a turbomachine, the airfoil comprising:
    an airfoil body including at least two discontinuous first coolant passages, an edge opening in a leading edge or a trailing edge of the airfoil body, the edge opening having a plurality of edge coupon retention member seats each including a ridge protrusion in or on an inner surface of the airfoil body and extending inwardly from an inner surface of the airfoil body, wherein the at least two discontinuous first cooling passages each include an opening adjacent the edge opening; and
    an edge coupon having a shape at least partially configured for coupling to the edge opening in the airfoil body, the edge coupon including:
    an edge coupon body,
    at least one second coolant passage in the edge coupon body configured for fluid communication with the at least two discontinuous first coolant passages in the airfoil body, such that the at least one second coolant passage fluidly couples the at least two discontinuous first coolant passages together to define a single continuous coolant passage within the airfoil, and
    a plurality of retention members each extending from the edge coupon body for coupling to the plurality of edge coupon retention member seats in the airfoil body and spaced about the edge coupon body to engage with a respective one of the plurality of retention member seats.

2. The airfoil of claim 1, further comprising a brazing material coupling the edge coupon to the airfoil body along at least mating surfaces of the edge coupon body and the airfoil body.

3. The airfoil of claim 1, wherein the plurality of retention member seats includes a first retention member seat at a first axial depth position relative to the leading edge or the trailing edge of the airfoil body, and a second retention member seat at a second, different axial depth position relative to the leading edge or the trailing edge of the airfoil body.

4. The airfoil of claim 1, wherein the edge coupon is made of material having a first coefficient of thermal expansion (CTE), and the airfoil body is made of material having a second CTE that is different than the first CTE of the edge coupon.

5. The airfoil of claim 1, wherein the at least two discontinuous first coolant passages are aligned along an axial length of the airfoil body, and wherein the at least one second coolant passage extends across an entire axial span of the edge coupon body.

6. A method of forming an airfoil for a blade or nozzle of a turbomachine, the method comprising:
providing an airfoil body including at least two discontinuous first coolant passages therein and an edge opening in a leading edge or a trailing edge of the airfoil body, the edge opening having a plurality of edge coupon retention member seats each including a ridge protrusion in or on an inner surface of the airfoil body and extending inwardly from an inner surface of the airfoil body, wherein the at least two discontinuous first cooling passages each include an opening adjacent the edge opening;
providing a first edge coupon having a shape at least partially configured for coupling to the edge opening in the airfoil body, the first edge coupon including: an edge coupon body, at least one second coolant passage in the edge coupon body, and a plurality of retention members extending from the edge coupon body for coupling to the plurality of retention member seats in the edge opening in the airfoil body; and
coupling the first edge coupon to the airfoil body such that the at least one second coolant passage is in fluid communication with the at least two discontinuous first coolant passages in the airfoil body, such that the at least one second coolant passage fluidly couples the at least two discontinuous first coolant passages together to define a single continuous coolant passage within the airfoil, and each of the plurality of retention members couples to a respective one of the plurality of retention member seats in the edge opening in the airfoil body.

7. The method of claim 6, wherein the coupling further includes metallurgically coupling the first edge coupon to the airfoil body along at least mating surfaces of the edge coupon body and the airfoil body.

8. The method of claim 7, wherein the metallurgically coupling includes heating the edge coupon and the airfoil body, pressing the edge coupon body to the airfoil body, and brazing the edge coupon body to the airfoil body.

9. The method of claim 6, wherein the providing the airfoil body includes manufacturing the airfoil body with the edge opening and the plurality of retention member seats as an integral ridge extending inwardly from the inner surface of the airfoil body.

10. The method of claim 9, wherein the manufacturing the airfoil body includes one of investment casing or additively manufacturing.

11. The method of claim 6, wherein each retention member includes a flexible element having a retention seat engaging element at a distal end thereof for engaging with one of the plurality of retention member seats of the airfoil body.

12. The method of claim 6, wherein the providing the airfoil body includes providing the airfoil body with a first retention member seat of the plurality of retention member seats at a first axial depth position relative to the leading edge or the trailing edge of the airfoil body, and a second retention member seat of the plurality of retention member seats at a second, different axial depth position relative to the leading edge or the trailing edge of the airfoil body; and
further comprising removing a second edge coupon from the airfoil body, the second edge coupon coupled to the first retention member seat, the removing including enlarging the edge opening to remove the first retention member seat, leaving the second retention member seat; and
wherein coupling the first edge coupon to the airfoil body includes coupling at least one retention member of the plurality of retention members to the second retention member seat in the airfoil body.

13. An edge coupon for a nozzle or blade of a turbomachine, the edge coupon comprising:
an edge coupon body having a shape at least partially configured for coupling to an opening in a leading edge or a trailing edge of an airfoil body of the nozzle or the blade;
at least one coolant passage in the edge coupon body configured for fluid communication with at least two discontinuous coolant passages in the airfoil body, wherein the at least one coolant passage in the edge coupon is shaped to fluidly couple the at least two discontinuous coolant passages together to define a single continuous coolant passage within the nozzle or blade; and
a plurality of retention members each extending from the edge coupon body for coupling to a plurality of edge coupon retention member seats in the edge opening in the airfoil body, the plurality of edge coupon retention member seats each including a ridge protrusion in or on an inner surface of the airfoil body and extending inwardly from an inner surface of the airfoil body, and segmented along a length of the airfoil body such that at least two edge coupon retention member seats are spaced within the at least one coolant passage in the airfoil body.

14. The edge coupon of claim 13, wherein each retention member includes a flexible element having a retention seat engaging element at a distal end thereof for engaging with a respective one of the plurality of edge coupon retention member seats in the edge opening in the airfoil body.

15. The edge coupon of claim 13, wherein the plurality of retention members are spaced about the edge coupon body to engage with the plurality of edge coupon retention member seats in the edge opening in the airfoil body.

16. An airfoil for a blade or nozzle of a turbomachine, the airfoil comprising:
an airfoil body including at least two discontinuous first coolant passages, and an edge opening in a leading edge or a trailing edge of the airfoil body, the edge opening having a plurality of edge coupon retention member seats each including a ridge protrusion in or on an inner surface of the airfoil body and extending inwardly from an inner surface of the airfoil body, wherein the at least two discontinuous first cooling passages each include an opening adjacent the edge opening, the plurality of edge coupon retention member seats segmented along a length of the airfoil body such that at least two edge coupon retention member seats are spaced within the at least one first coolant passage, wherein the at least two discontinuous first cooling passages each include an opening adjacent the edge opening; and an edge coupon having a shape at least partially configured for coupling to the edge opening in the airfoil body, the edge coupon including:

an edge coupon body, at least one second coolant passage in the edge coupon body configured for fluid communication with the at least two discontinuous first coolant passages in the airfoil body, such that the at least one second coolant passage fluidly couples the at least two discontinuous first coolant passages together to define a single continuous coolant passage within the airfoil, and a plurality of retention members each extending from the edge coupon body for coupling to the plurality of edge coupon retention member seats in the airfoil body and spaced about the edge coupon body to engage with a respective one of the plurality of retention member seats.

17. The airfoil of claim 16, wherein each of the plurality of retention members includes a flexible element having a retention seat engaging element at a distal end thereof for engaging with a respective one of the plurality of retention member seats on the inner surface of the airfoil body.

18. The airfoil of claim 16, wherein the plurality of retention member seats includes a first retention member seat at a first axial depth position relative to the leading edge or the trailing edge of the airfoil body, and a second retention member seat at a second, different axial depth position relative to the leading edge or the trailing edge of the airfoil body.

19. The airfoil of claim 16, further comprising a brazing material coupling the edge coupon to the airfoil body along at least mating surfaces of the edge coupon body and the airfoil body.

20. The airfoil of claim 16, wherein the edge coupon is made of material having a first coefficient of thermal expansion (CTE), and the airfoil body is made of material having a second CTE that is different than the first CTE of the edge coupon.

* * * * *